United States Patent [19]

Numazawa et al.

[11] Patent Number: 5,014,148
[45] Date of Patent: May 7, 1991

[54] PERPENDICULAR MAGNETIC RECORDING AND REPRODUCING HEAD

[75] Inventors: Junji Numazawa; Yoshiro Yoneda, both of Tokyo; Fusayoshi Aruga, Shimosuwa, all of Japan

[73] Assignees: Nippon Hoso Kyokai, Tokyo; Kabushiki Kaisha Sankyo Seiki Seisakusho, Shimosuwa, both of Japan

[21] Appl. No.: 329,780

[22] PCT Filed: Sep. 9, 1987

[86] PCT No.: PCT/JP87/00668
§ 371 Date: Mar. 8, 1989
§ 102(e) Date: Mar. 8, 1989

[87] PCT Pub. No.: WO88/02166
PCT Pub. Date: Mar. 24, 1988

[30] Foreign Application Priority Data

Sep. 11, 1986 [JP] Japan .................. 61-215457
Dec. 19, 1986 [JP] Japan .................. 61-301420
Feb. 2, 1987 [JP] Japan .................. 62-20453

[51] Int. Cl.$^5$ .............................................. G11B 5/127
[52] U.S. Cl. ..................................... 360/125; 360/122
[58] Field of Search ............... 360/122, 123, 125, 126, 360/127

[56] References Cited

U.S. PATENT DOCUMENTS 4,639,810 1/1987 Sakai ........................ 360/122

FOREIGN PATENT DOCUMENTS 56-0087220 7/1981 Japan .
58-0111823 7/1982 Japan .
57-0205810 12/1982 Japan .
58-0153216 9/1983 Japan .
58-0166522 10/1983 Japan .
59-0040314 3/1984 Japan .
60-0210508 10/1985 Japan .
61-0051606 3/1986 Japan .
61-0284809 12/1986 Japan .

Primary Examiner—David J. Severin
Attorney, Agent, or Firm—Notaro & Michalos

[57] ABSTRACT

Improvements in the perpendicular magnetic recording and reproducing head of the type in which a main magnetic pole and an auxiliary magnetic pole are arranged as a unitary structure on one side of a magnetic recording medium. Problems are solved in relation to pseudo pulses in the output signals and change in the level, contributing to improving the sensitivity for recording and reproduction. The magnetic head is used for perpendicular VTR's. The perpendicular magnetic recording and reproducing head of the invention comprises a support block which consists of a main magnetic pole, a non-magnetic block which holds said main magnetic pole to form a surface opposed to the magnetic recording medium, and an auxiliary magnetic pole block which supports part of said main magnetic pole and which supports said non-magnetic block; and a magnetic block provided on the side surface of said support block in the direction of track width. The region opposed to the magnetic recording medium is constituted by the main magnetic pole, non-magnetic block and magnetic block.

10 Claims, 6 Drawing Sheets

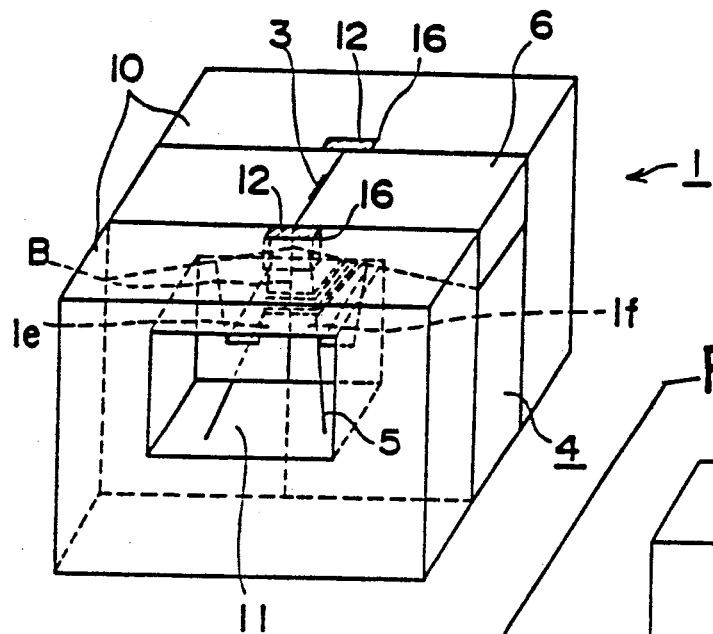
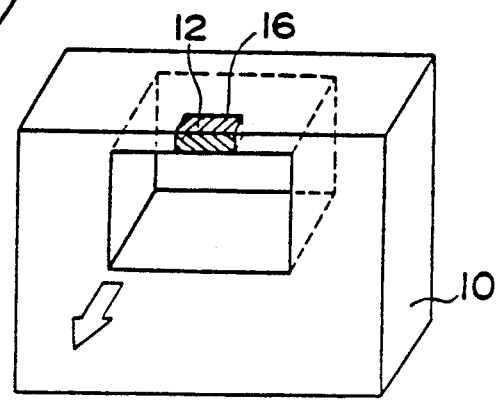
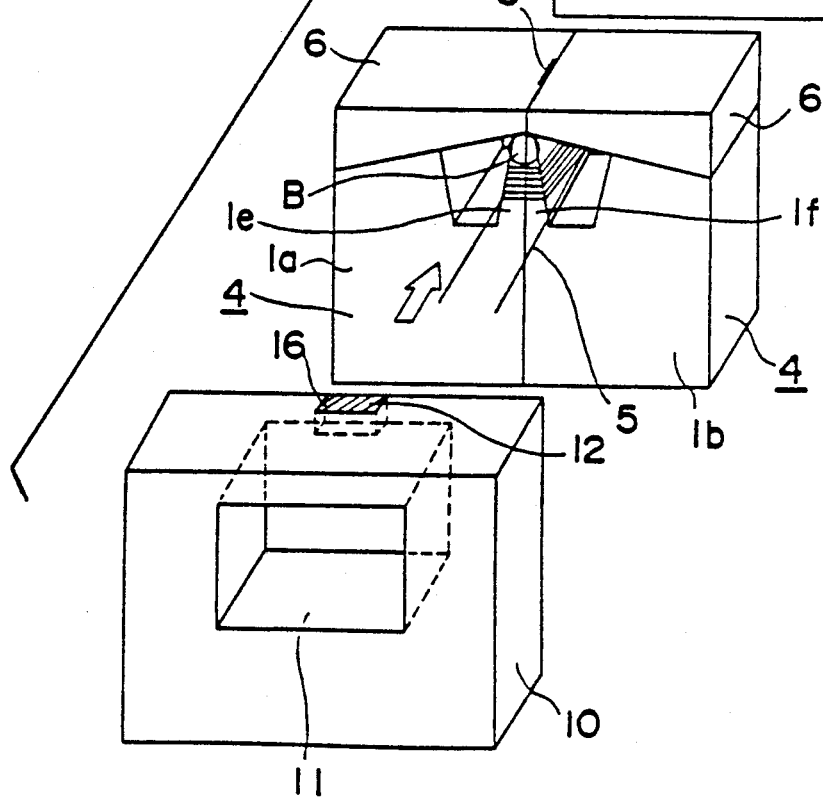

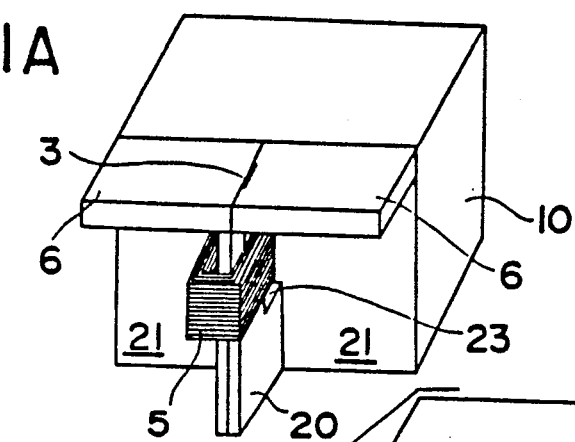
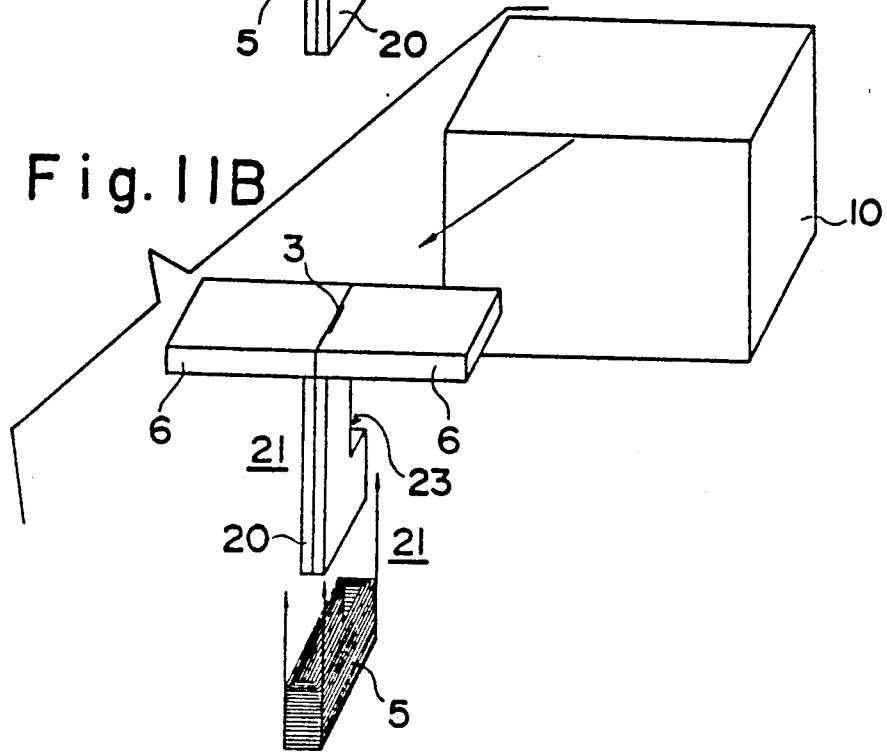
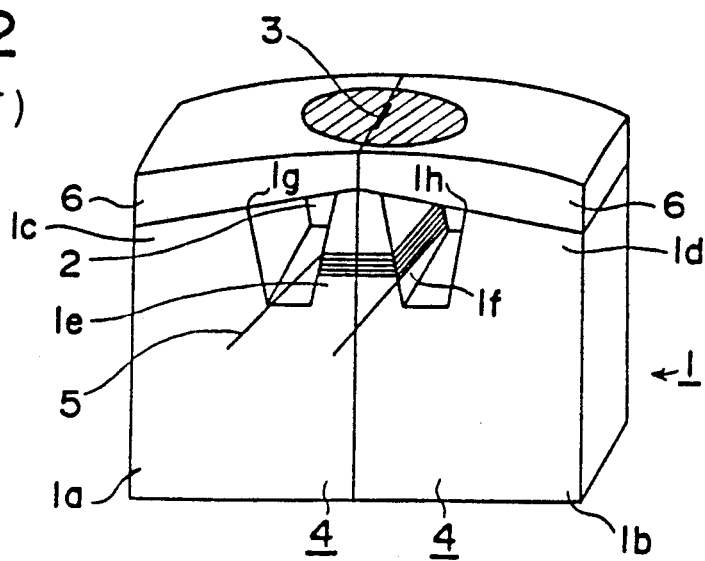
Fig. 12 (PRIOR ART)

PERPENDICULAR MAGNETIC RECORDING AND REPRODUCING HEAD

TECHNICAL FIELD

The present invention relates to a perpendicular magnetic recording and reproducing head. More particularly, the invention pertains to improvement in or relating to a perpendicular magnetic recording and reproducing head which is of the type in which a main magnetic pole and an auxiliary magnetic pole are arranged as a unitary structure in opposed relation to one side of a magnetic recording medium.

TECHNICAL TERMS

In this specification, a term "opposed area" is intended to mean a surface area of the magnetic recording and reproducing head which makes contact with the magnetic recording medium when the magnetic head is of the type that makes contact therewith for recording and reproducing, and a surface area of the magnetic head which is adjacent but spaced a short distance from the magnetic recording medium sufficient for recording and reproducing when the magnetic head is of the type that performs recording and reproducing without making contact with the magnetic recording medium.

A term "opposed surface" is intended to mean the surface of the magnetic head which is opposed to the perpendicular magnetic recording medium.

BACKGROUND ART

A conventional perpendicular magnetic recording and reproducing head of this kind has, as shown in FIG. 12, a structure in which non-magnetic blocks 6 and 6 having a suitable thickness and for providing the opposed surface are joined to the tops of auxiliary magnetic pole blocks 1a and 1b, each of the blocks 1a and 1b having a window 2 for coil winding use, to form a pair of support blocks 4 and 4, a main magnetic pole 3 is held between the pair of support blocks 4 and 4 to form a core chip 1, and the coil is wound through the coil winding windows 2 after the surfaces of the non-magnetic blocks 6 and 6 are polished into a spherical or similar form to be contacted with or opposed to a magnetic recording medium (Patent unexamined publication No. 40314/84 (TOKKAI Sho 59-40314)).

With the magnetic head of the above structure, a magnetic tape, magnetic disk or like magnetic recording medium is driven in sliding contact with or at a predetermined distance from the opposed area A centering about the main magnetic pole 3. Consequently, when a recording signal is applied to the coil and the main magnetic pole 3 is excited accordingly, a magnetic flux is induced from the main magnetic pole 3, by which a magnetic layer of that portion of the perpendicular magnetic recording medium which is being opposed to the upper end face of the main magnetic pole 3 is magnetized in a perpendicular direction. That is, magnetic flux flow circuit is established in which the magnetic flux emanating from the main magnetic pole 3 returns thereto via a route [the magnetic layer of the magnetic recording medium→a soft magnetic layer of the magnetic recording medium→the magnetic layer→an air gap (between the surfaces of the non-magnetic blocks 6, 6 and the magnetic recording medium)→the non-magnetic blocks 6, 6→return path portions 1c and 1d of the auxiliary magnetic pole blocks 1a and 1b→main magnetic pole holding portions 1e and 1f]. During reproducing a magnetic flux flow circuit is provided in which a signal current is applied to the coil 5 by a signal recorded in the magnetic layer of the magnetic recording medium via a route reverse from the above-mentioned one for magnetic recording.

In this kind of head, the primary factor that determines its recording and reproducing sensitivity depends on the reluctance of the magnetic flux flow circuit. In other words, the smaller the reluctance is, the more the recording and reproducing sensitivity increases.

In the conventional perpendicular magnetic recording and reproducing head, however, it is difficult to increase the recording and reproducing sensitivity, because the magnetic flux flow circuit includes the air gap and the non-magnetic blocks 6 and therefore has a large reluctance.

To decrease the reluctance, it is also possible, for instance, in the prior art example of FIG. 12, to adopt an arrangement in which the return path portions 1c and 1d of the auxiliary magnetic pole blocks 1a and 1b are directly opposed to the magnetic recording medium with no non-magnetic blocks 6 and 6 interposed therebetween so that the magnetic recording medium is driven in direct sliding contact with or at a predetermined distance from the return path portions. In this instance, however, edges 1g and 1h of the return path portions 1c and 1d are exposed to the magnetic recording medium and perform the function of what is called a pseudo magnetic recording and reproducing gap, inevitably producing an adverse effect of introducing pseudo pulses into the signal output.

Furthermore, if the condition of contact between the magnetic recording medium and the magnetic head, for example, the contact pressure therebetween or the infeed of the magnetic head to the magnetic recording medium, is changed by any unsuspected reason, the distance between the magnetic recording medium and the return path portions 1c and 1d also changes, posing problems such as fluctuations in the output signal level because of the fluctuations of the reluctance.

DISCLOSURE OF THE INVENTION

An object of the present invention is, therefore, to provide a new perpendicular magnetic recording and reproducing head of high recording and reproducing sensitivity which is free from the above-mentioned problems of the generation of pseudo pulses in the output signal and the output level fluctuation.

To attain the above objective, the perpendicular magnetic recording and reproducing head of the present invention has a main magnetic pole, a support block holding the main magnetic pole which is composed of an auxiliary magnetic block and a non-magnetic block, wherein the auxiliary magnetic pole block is provided with a main magnetic pole holding portion holding a part of the main magnetic pole and having a coil wound thereon, and the non-magnetic block is mounted on the auxiliary magnetic pole block on the side facing toward a perpendicular magnetic recording medium with holding a part of the main magnetic pole and forms a surface opposed to the recording medium, and at least one magnetic block which is mounted on one side of the support block in the widthwise direction of recording tracks of the recording medium, i.e. in a direction perpendicular to the their lengthwise direction, wherein the magnetic block protrudes toward the perpendicular magnetic recording medium from the plane in which the auxiliary magnetic pole block and the non-magnetic block are joined together, whereby the main magnetic pole, the non-magnetic block and the magnetic block form an area opposed to the recording medium.

With such a structure, a magnetic flux flow circuit is provided in which the magnetic flux flowing from the magnetic recording medium to the magnetic head returns to the auxiliary magnetic pole block via the magnetic block in the opposed area. A magnetic circuit widthwise of tracks is formed in which the recording medium and the magnetic block make direct contact with each other.

Consequently, according to the present invention, the provision of the magnetic block affords the reduction of the reluctance and permits enhancement of the recording and reproducing sensitivity. In addition, no pseudo gap is formed by the magnetic block, the magnetic head of the present invention is free from the generation of pseudo pulses and the level fluctuation of the output signal.

By employing a structure in which a section of the main magnetic pole block holding portion of the auxiliary magnetic pole block nearer the magnetic recording medium than the coil winding section abuts against the non-magnetic block and a section farther apart from the recording medium than the coil winding section abuts against the auxiliary magnetic pole block, or a non-magnetic material layer is provided at a section closer to the recording medium than the coil winding section, the main magnetic pole holding portion and the magnetic block are magnetically insulated from each other so as to prevent the formation therebetween of a shorted magnetic path, it is possible to offer a magnetic head which is free from degradation of its recording and reproducing characteristic resulted from the magnetic short circuit.

Moreover, the use of a magnetic film for the magnetic block for forming the return path will allow ease in the reduction of the thickness of the perpendicular magnetic recording and reproducing head and simplification of its manufacture.

In the perpendicular magnetic recording and reproducing head according to another aspect of the present invention, a main magnetic pole is held to a support block which is composed of a main magnetic holding portion and a non-magnetic block, wherein the main magnetic pole holding portion holds a part of the main magnetic pole, and the non-magnetic block is joined to the main magnetic pole holding portion on the side facing toward a perpendicular magnetic recording medium with holding a part of the main magnetic pole and forms a surface opposed to the recording medium, and which support block has, on one side of the main magnetic pole holding portion in the widthwise direction of recording tracks, coil inserting portion which permits the insertion of a coil. The coil is put on the main magnetic pole holding portion through the coil inserting portion. Further, a magnetic block is provided on one side of the support block in the widthwise direction of the recording tracks. The area opposed to the recording medium is formed by the main magnetic pole, the non-magnetic block and the magnetic block. Since the main magnetic pole holding portion holding the main magnetic pole is surrounded by an open space, the space for the coil can be increased and its winding process can be achieved simply by putting a prewound coil on the main magnetic pole holding portion; so that the coil winding process can be simplified and the massproductivity of the head is enhanced accordingly.

BRIEF DESCRIPTION OF THE DRAWINGS

FIG. 3 is a perspective view illustrating another embodiment of the present invention;

FIG. 4 is its exploded perspective view;

FIG. 11A is a perspective view illustrating still another embodiment of the second respect of the invention;

FIG. 11B is its exploded perspective view;

FIG. 12 is a perspective view showing a conventional perpendicular magnetic recording and reproducing head.

BEST MODE FOR CARRYING OUT THE INVENTION

Figure 1:
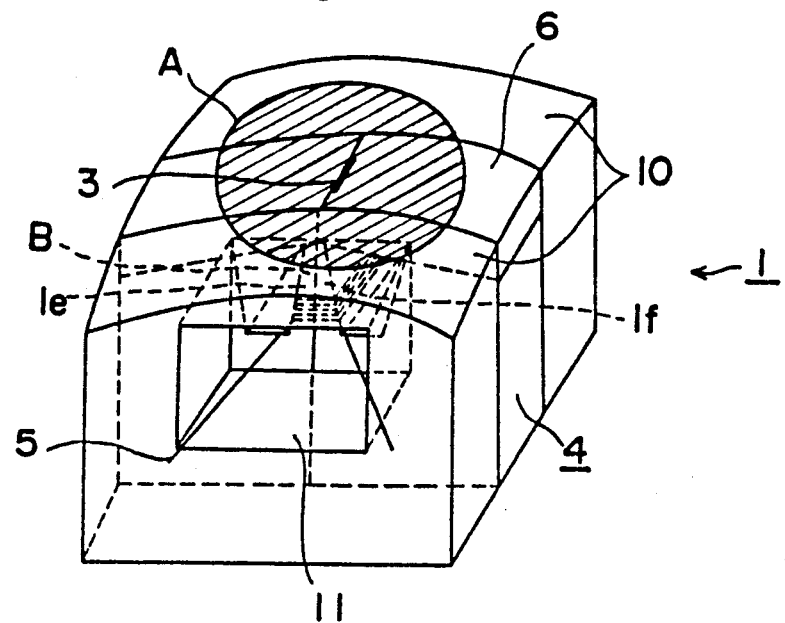
FIG. 1 is a perspective view showing an of the perpendicular magnetic recording and reproducing head of the present invention.

The constitution of the present invention will hereinafter be described in detail in conjunction with its embodiment shown in the drawings. In the embodiments parts and structures corresponding to those in the conventional perpendicular magnetic recording and reproducing head shown in FIG. 12 will be identified by the same reference numerals and will not be described in detail.

FIG. 1 illustrates, in perspective, an embodiment of a first respect of invention. the basic structure will be described.

In this perpendicular magnetic recording and reproducing head, the core chip 1 is formed by joining the pair of support blocks 4 and 4 with the main magnetic pole 3 made of a thin magnetic film held between their butted end faces. The pair of support blocks 4,4 are composed of the auxiliary magnetic pole blocks 1a and 1b, each having the coil winding window 2, and the non-magnetic blocks 6 and 6 mounted on the tops of the auxiliary magnetic pole blocks 1a and 1b and forming the surface opposed to the recording medium. A magnetic block 10 as of ferrite is mounted on at least one side of the support block 4, 4, that is, at least on one of its both sides in the widthwise direction of recording tracks on the recording medium, i.e. in a direction perpendicular to their lengthwise direction. The area A opposed to the perpendicular magnetic recording medium is formed by the main magnetic pole 3, the non-magnetic blocks 6, 6 and, the magnetic block 10 as centering about the main magnetic pole 3. During the recording and reproducing, the magnetic circuit is provided in which the magnetic flux flows via a route [the main magnetic pole 3→the magnetic layer of the perpendicular magnetic recording medium→the soft magnetic layer→the magnetic layer→the magnetic block 10→the auxiliary magnetic pole blocks 1a and 1b →the main magnetic pole 3].

Figure 2:
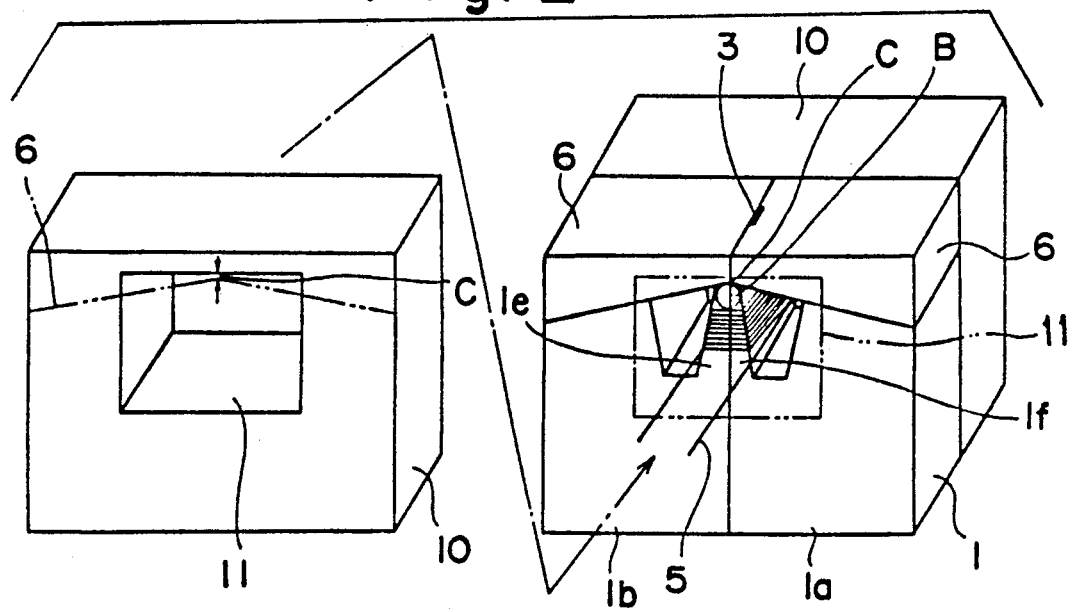
FIG. 2 is its exploded perspective view.

The magnetic block 10 has an opening 11 at a position facing to the coil winding windows 2 of the support blocks 4 and 4. The coil 5 is wound and led out through the opening 11. The opening 11 of the magnetic block 10 is made sufficiently large as shown in FIG. 2, therefore between the section B of the main magnetic holding portions 1e, 1f nearer the magnetic recording medium than the section having wound thereon the coil 5 and the magnetic block 10 are separated by an air gap C, and hence they are magnetically isolated from each other. Incidentally, the imaginary line in FIG. 2 shows the position of the opening 11 of the magnetic block 10 relative to the lower edge of the non-magnetic blocks 6, 6 of the support blocks 4, 4 when the magnetic block 10 adjoins to the support blocks 4, 4.

While the example of FIG. 1 employs the pair of symmetrically structured support blocks 4 and 4 for holding therebetween the main magnetic pole 3, the invention is not limited specifically thereto but may also use a combination of the above-mentioned support block 4 and a block made of a non-magnetic material alone. Also in this instance, the same magnetic flux flow circuit as the above-mentioned can be provided and the same effect can be obtained.

Now, in the case of adjoining the magnetic blocks 10, 10 to the support blocks 4, 4, if the main magnetic pole 3 or main magnetic pole holding portions 1e, 1f is brought into direct contact with the magnetic blocks 10, 10 at that section (indicated by B in FIG. 2) of the main magnetic pole holding portions 1e, 1f of the auxiliary magnetic pole blocks 1a, 1b nearer the magnetic recording medium that the coil winding section, then during recording the magnetic flux emanating from the coil 5 will return thereto through the magnetic blocks 10, 10 without passing through the magnetic recording medium and during reproducing the magnetic flux caused by a signal recorded an the magnetic layer of the magnetic recording medium will return thereto without passing through the coil 5, and consequently, the intended magnetic flux flow circuit will not be provided. To avoid this, the section indicated by B and the magnetic blocks 10, 10 need to be magnetically isolated as shown in FIG. 2, for example, and air gaps C are utilized therefor in the embodiment of FIG. 2.

FIGS. 3 and 4 illustrate an embodiment which employs magnetic isolating means in place of the air gap C used in FIG. 2.

The perpendicular magnetic recording and reproducing head of this embodiment is adapted so that non-magnetic material 12 is interposed, as the above-mentioned isolating means, between the section B and the magnetic blocks 10, 10. For example, grooves 16, 16 are provided in that portion of the magnetic blocks 10, 10 which are respectively faced to the section B of the main magnetic pole holding portions 1e, 1f nearer the magnetic recording medium than the section having wound thereon the coil 5, and the grooves 16, 16 are filled with the non-magnetic material 12 such as glass. The non-magnetic material 12 need not always be provided in a very limited portion of the magnetic blocks as depicted in FIG. 3 but may also be extended in the direction of travel of the magnetic recording medium, that is, in the lateral direction or in the vertical direction in FIG. 3. In this case, the grooves 16, 16 can easily be provided. Moreover, the shape of the grooves 16, 16 are not limited specifically to the illustrated one but may also be semi-circular or triangular in cross section.

Figure 5A:
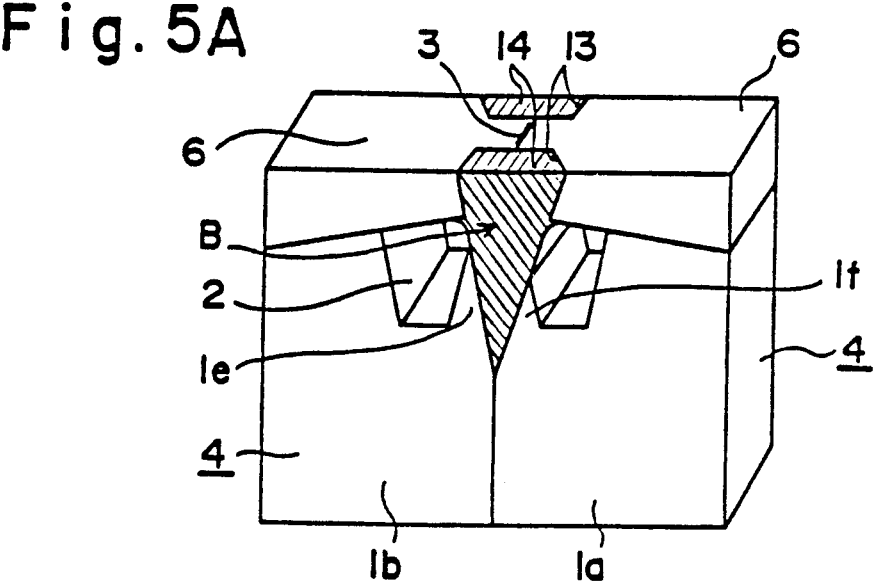
FIG. 5A is a perspective view showing a support block portion in another embodiment of the present invention.
Figure 5B:
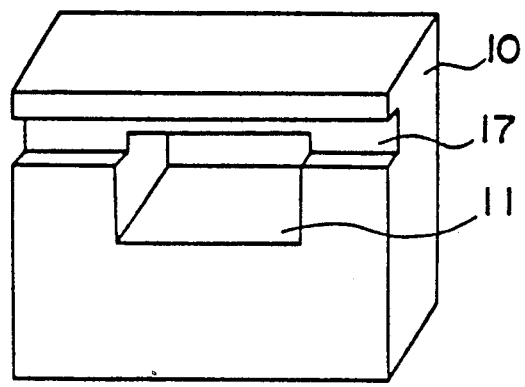
FIG. 5B is a perspective view similarly showing another support block portion.
Figure 5C:
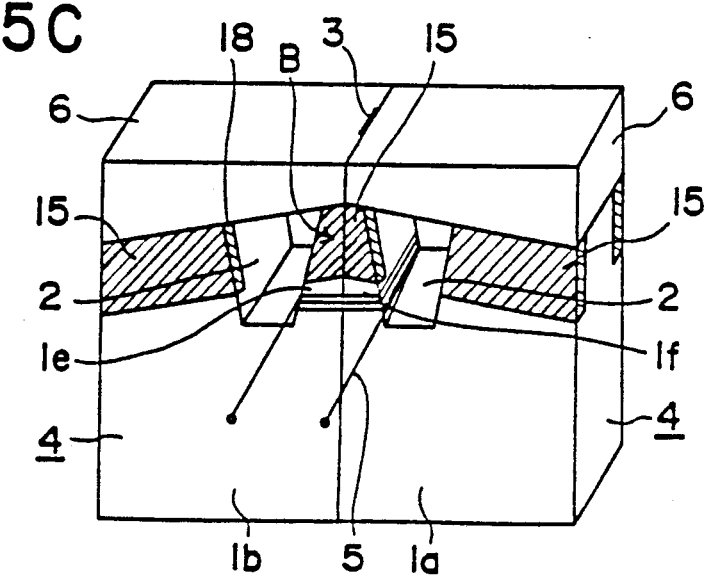
FIG. 5C is also a perspective view similarly showing another support block portion.

It is also possible to house non-magnetic material 14 such as glass in notches 13 which extend from that section B of the main magnetic pole holding portions 1e, 1f of the auxiliary magnetic pole blocks 1a, 1b nearer the magnetic recording medium to the non-magnetic blocks 6, 6, as shown in FIG. 5A. Further in order to magnetically isolate between section B and the magnetic block 10, a groove 17 may be provided in the magnetic block 10 at a position corresponding to that near the magnetic recording medium section B of the main magnetic pole holding portion 1e, 1f, as shown in FIG. 5B, or grooves 18 of the same width may be provided in those upper sections of the auxiliary magnetic pole blocks 1a, 1b adjoining the non-magnetic blocks 6, 6, followed by housing a non-magnetic material 15 such as glass in them, as shown in FIG. 5C.

The production of the above-described magnetic head poses problems in that the reduction of the thickness of the head makes its manufacture difficult because the magnetic blocks 10, 10 and the support blocks 4, 4 must be thinned and that the number of parts used is relatively large because the magnetic blocks 10, 10 are needed in addition to the support blocks 4, 4.

Next, a description will be given of another embodiment of the perpendicular magnetic recording and reproducing head which allows ease in its thinning and permits simplification of its manufacture.

Figure 6:
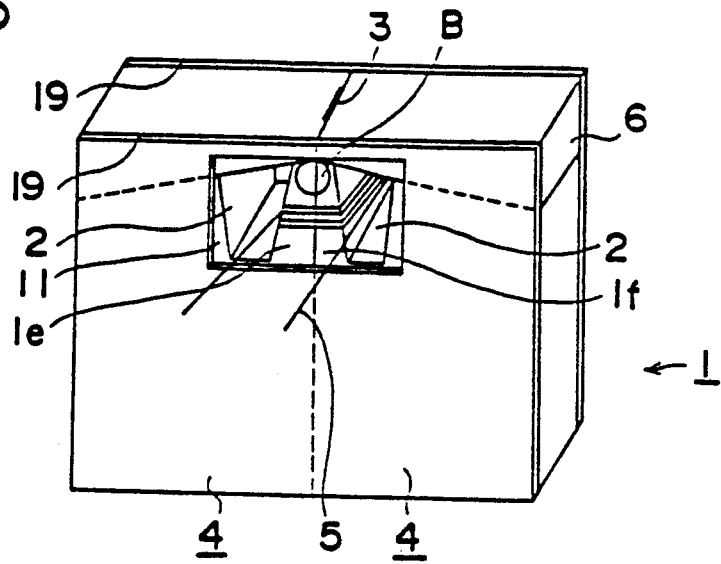
FIG. 6 is a perspective view illustrating another embodiment of the present invention.

The perpendicular magnetic recording and reproducing head depicted in FIG. 6 differs from the embodiment of FIG. 1 in that, instead of fixedly mounting the preformed magnetic blocks 10, 10 on the support blocks 4, 4, a thin magnetic films 19, 19 are deposited by a sputtering, vacuum evaporation or like process over either side (or one side) of the support blocks 4, 4 in the widthwise direction of recording tracks of the recording medium to form thin magnetic blocks, which are used as the return path in the widthwise direction of recording tracks. In this instance, the deposition of the thin magnetic films 19, 19 over the main magnetic pole holding portions 1e, 1f with the coil 5 wound thereon and the adjoining portions are prohibited by ethcing after evaporation or masking prior thereto so that no shorted magnetic flux flow path is formed by the thin magnetic film 19. In particular, in the case of removing the thin magnetic films 19, 19 after them depositions, care is taken so that no thin magnetic films 19, 19 are left on side surfaces of that section B of the main magnetic pole holding portion 1e, 1f nearer to the magnetic recording medium than the section having thereon the coil 5, thereby magnetically insulating the main magnetic pole holding portion 1e, 1f from the thin magnetic film 19.

Another problem which is encountered in the manufacture of the above-described magnetic head is that the coil winding process is troublesome and the number of turns of the coil cannot be made large, because the coil 5 must be wound around the main magnetic pole holding portions 1e, 1f through the narrow windows surrounded by the auxiliary magnetic pole blocks 1a, 1b and the magnetic blocks 10, 10.

Next, a description will be given of an embodiment of the perpendicular magnetic recording and reproducing head of another respect of the invention which is structured so that the coil winding step can be simplified.

Figure 7:
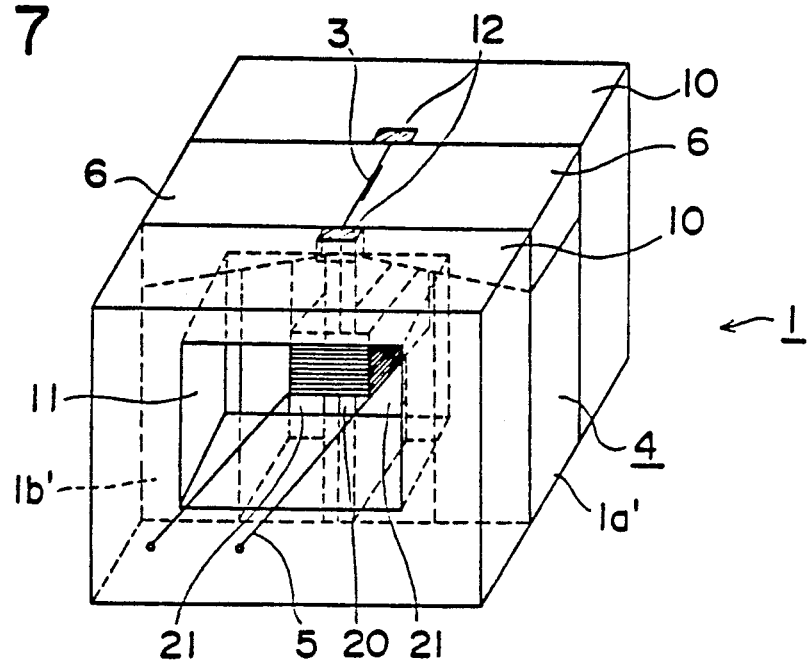
FIG. 7 is a perspective view illustrating embodiment of another respect of the invention.
Figure 8:
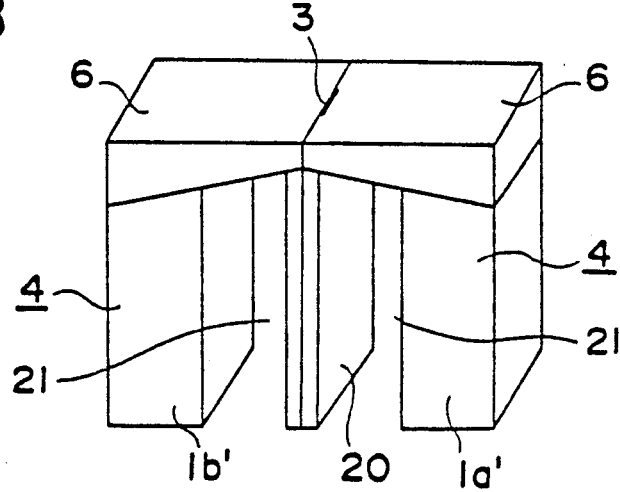
FIG. 8 is a perspective view showing its support block.

In FIGS. 7 and 8, the support blocks 4, 4 are formed by square auxiliary magnetic pole blocks 1a', 1b', a pair of main magnetic pole holding portions 20, 20 made of a magnetic material and holding a part of the main magnetic pole 3, therebetween and a pair of non-magnetic blocks 6, 6 joined to the main magnetic pole holding portions 20, 20 on the side facing toward the magnetic recording medium respectively, holding a part of the main magnetic pole therebetween and forming the opposed surface. On outer sides of the main magnetic pole holding portions 20, 20 in the lengthwise direction of recording tracks formed on the recording medium winding inserting portions 21, 21 are provided through which the coil 5 can be inserted.

With the support blocks 4, 4 of such a structure, the spaces for winding the coil 5 are increased, and in addition, the coil need not be wound directly around the main magnetic pole holding portions 20, 20, but the coil 5 wound on a bobbin or the like in another step needs only to be put on the main magnetic pole holding portions 20, 20 from its open end through the winding inserting portions 21, 21. Accordingly, the coil winding process is markedly simplified.

In the magnetic head illustrated in FIG. 1, the return path portions 1c and 1d of the auxiliary magnetic pole blocks 1a, 1b in the support blocks 4, 4 are not so important, since the magnetic blocks 10 provide magnetic flux return paths in the widthwise direction of recording tracks of the magnetic recording medium. That is to say, in the magnetic head has no magnetic flux return path in the widthwise direction of recording tracks as in the prior art example of FIG. 12, the characteristic of the head depends largely on auxiliary magnetic pole blocks, and the positional relationships of the return path portions 1c and 1d thereof to the recording medium and the main magnetic pole 3. It has been found out by the present inventors that, in the case where the return path portions are provided by the magnetic blocks 10, 10 in the widthwise direction of tracks, however, the magnetic flux from the main magnetic pole 3 flows via the return paths in the direction of the track width, and consequently, even if the return path portions 1c and 1d of the auxiliary magnetic pole blocks 1a and 1b are not provided, the above-mentioned characteristic will not significantly be affected.

Figure 9:
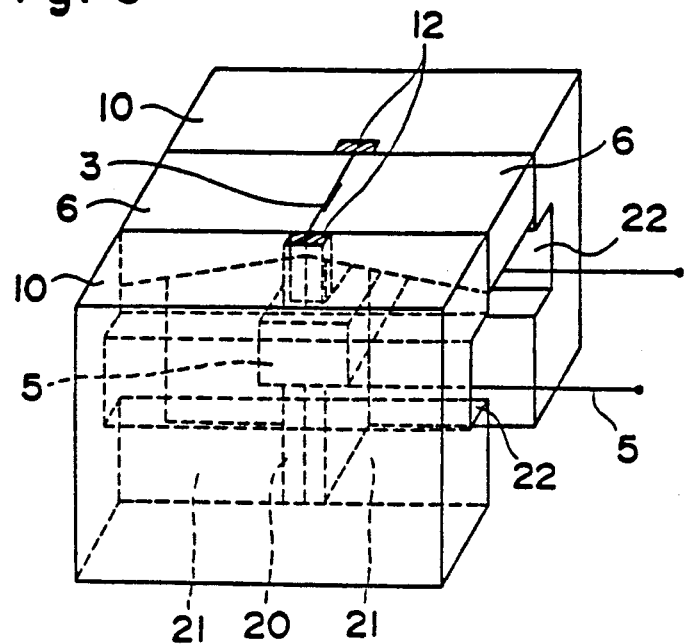
FIG. 9 is a perspective view illustrating another embodiment of the second respect of the invention.
Figure 10:
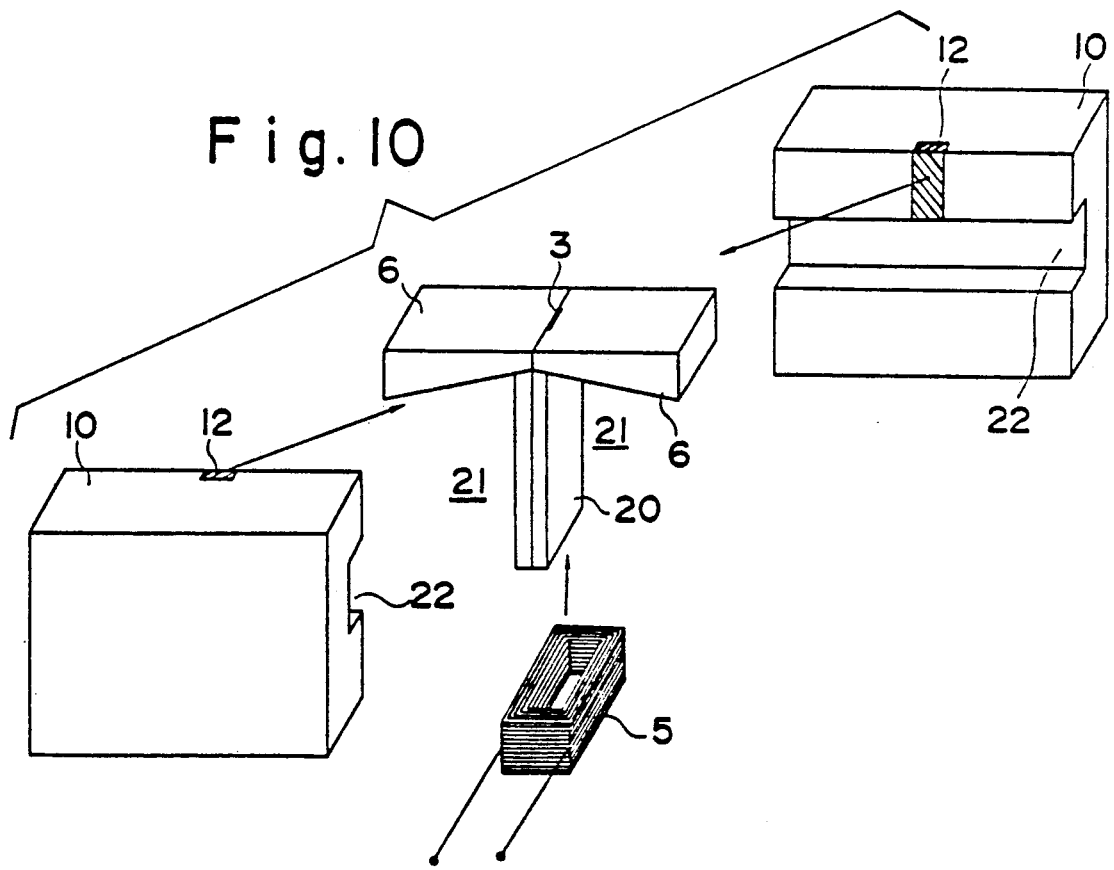
FIG. 10 is a its exploded perspective view.

FIGS. 9 and 10 illustrate another embodiment of the present invention disigned in view of the above respect, and in which the auxiliary magnetic pole blocks 1a' and 1b' are completely removed from the support blocks 4, 4 in FIG. 8, leaving the main magnetic pole holding portions 20, 20 alone to form the winding inserting portions 21, 21 open to its both sides and underside. Incidentally, in this embodiment each magnetic block 10 has a groove 22 for leading out the coil 5, that is, a coil relief portion. In the case of this embodiment, the lower end portion of each magnetic block 10 makes direct contact with the main magnetic pole holding portion 20 to form the return path in the widthwise direction of tracks and the magnetic path can easily be formed, so that there is no need of using the bulky auxiliary magnetic pole blocks 1a and 1b which contain the main magnetic pole holding portions 1e and 1f as porsions of unitary structure, as shown in FIGS. 1 through 6.

FIG. 11 illustrates still another embodiment of the present invention, in which a notch 23, that is, a coil relief portion, is provided in each main magnetic pole holding portion 20 for leading out the coil 5, although in the embodiment of FIG. 10 the groove 22 for the coil is provided in the magnetic block 10.

FIELD OF APPLICATION

The perpendicular magnetic recording and reproducing head of the present invention can widely be applied to magnetic heads for perpendicular VTR's, perpendicular floppy disks, perpendicular hard disks and other perpendicular recording.

We claim:

1. A perpendicular magnetic recording and reproducing head, which includes a main magnetic pole, an auxiliary magnetic pole block which is provided with a main magnetic pole holding portion holding a part of said main magnetic pole and having wound thereon a coil, a non-magnetic block which is joined to the auxiliary magnetic pole block on the side thereof near a perpendicular magnetic recording medium with holding a part of said main magnetic pole and forms a surface opposed to the recording medium, wherein said non-magnetic block and the auxiliary magnetic pole block constitute a support block holding the main magnetic pole, and at least one magnetic block which is provided on a side of the support block in the widthwise direction of recording tracks of the recording medium, perpendicular to their lengthwise direction, wherein said magnetic block protrudes toward the perpendicular magnetic recording medium from the plane in which the auxiliary magnetic pole block and the non-magnetic block are joined together, in order that said main magnetic pole, said non-magnetic block and said magnetic block form an area opposed to the perpendicular magnetic recording medium.

2. A perpendicular magnetic recording and reproducing head according to claim 1, wherein said auxiliary magnetic pole block has a coil winding window for winding the coil, the coil winding window is closed with the non-magnetic block on the side near the perpendicular magnetic recording medium, and an opening for leading out the coil is provided in the magnetic block corresponding to the coil winding window position in the widthwise direction of tracks.

3. A perpendicular magnetic recording and reproducing head according to claim 1, wherein said magnetic block abuts against the auxiliary magnetic pole block at its section farther apart from the recording medium than the coil winding section of the main magnetic pole holding portion and does not abut against the main magnetic pole holding section at its portion nearer the recording medium than the coil winding section but abuts against the non-magnetic block at that section.

4. A perpendicular magnetic recording and reproducing head according to claim 3, wherein said auxiliary magnetic pole block has a groove filled with a non-magnetic material for magnetically insulating the main magnetic pole holding portion and the magnetic block from each other.

5. A perpendicular magnetic recording and reproducing head according to claim 3, wherein said magnetic block is constituted by a thin magnetic film formed in a thin film form.

6. A perpendicular magnetic recording and reproducing head according to claim 3, wherein said magnetic block has an opening passing therethrough in the widthwise direction of recording tracks of the perpendicular magnetic recording medium perpendicular to their lengthwise direction, a marginal section of the opening near the recording medium abuts against said non-magnetic block, the opposite marginal section farther apart from the recording medium abuts against the auxiliary magnetic pole block, and the coil is led out through the opening.

7. A perpendicular magnetic recording and reproducing head according to claim 6, wherein said magnetic block has, in the marginal section of its opening near the recording medium, a groove extending to the opening and filled with the non-magnetic material.

8. A perpendicular magnetic recording and reproducing head according to claim 3, wherein said magnetic block has a groove formed in its side surface nearer the recording medium than the coil winding section of the main magnetic pole holding portion and facing toward the main magnetic pole holding portion, and the groove is filled with a non-magnetic material to magnetically insulate the main magnetic pole holding portion and the magnetic block from each other.

9. A perpendicular magnetic recording and reproducing head according to claim 8, wherein said magnetic block or said main magnetic pole holding portion has a relief portion for the coil.

10. A perpendicular magnetic recording and reproducing head which includes a main magnetic pole, a main magnetic pole holding portion which is made of a magnetic material and holding a part of the main magnetic pole, a non-magnetic block which is joined to the main magnetic pole holding portion on the side thereof near a perpendicular magnetic recording medium with holding a part of the main magnetic pole and which form a surface opposed to the recording medium, wherein said main magnetic pole holding portion and said non-magnetic block constitute a support block which has, one side of the main magnetic pole holding portion in the lengthwise direction of recording tracks of the recording medium, a coil inserting portion through which a coil can be inserted, a coil which is put on said main magnetic pole holding portion through the winding inserting portion, and at least one magnetic block which is provided on the support block on the side thereof in the widthwise direction of tracks, in order that said main magnetic pole, said non-magnetic block and said magnetic block form an area opposed to the perpendicular magnetic recording medium.

* * * * *